C. F. KETTERING & W. A. CHRYST.
CASH REGISTER.
APPLICATION FILED MAR. 14, 1910.

1,011,966.

Patented Dec. 19, 1911

WITNESSES:
INVENTORS
Charles F. Kettering
William A. Chryst
BY
ATTORNEYS

UNITED STATES PATENT OFFICE.

CHARLES F. KETTERING AND WILLIAM A. CHRYST, OF DAYTON, OHIO, ASSIGNORS TO THE NATIONAL CASH REGISTER COMPANY, OF DAYTON, OHIO, A CORPORATION OF OHIO, (INCORPORATED IN 1906.)

CASH-REGISTER.

1,011,966. Specification of Letters Patent. Patented Dec. 19, 1911.

Application filed March 14, 1910. Serial No. 549,086.

*To all whom it may concern:*

Be it known that we, CHARLES F. KETTERING and WILLIAM A. CHRYST, citizens of the United States, residing at Dayton, in the county of Montgomery and State of Ohio, have invented certain new and useful Improvements in Cash-Registers, of which we declare the following to be a full, clear, and exact description.

This invention relates to cash registers having a quick operation and low cost and among its objects is to provide a cash register which cannot ordinarily be operated nor the cash safe opened without effecting registration in a totalizer contained within a locked casing of the register.

Another object of the invention is to provide a cash register of the class described with a totalizer which cannot be reset.

Another object of the invention is to provide means under lock and key in the register whereby the cash safe may be opened without operating the totalizer.

Further objects of the invention are to provide a machine of the class described with a so-called locked keyboard construction with improved mechanism for operating indicator screens and indicator alining devices, and also with an improved bell hammer operating mechanism in which the power for operating the bell hammer is stored by the return stroke of the cash safe.

With these and incidental objects in view the invention consists in certain novel features of construction and combinations of parts the essential elements of which are set forth in appended claims and a preferred form of embodiment of which is hereinafter described with reference to the drawings which accompany and form part of the specification.

A machine is herein described which embodies the present improvements and is similar in respect to its main operating mechanism to the cash register described in a copending application of C. F. Kettering and Wm. A. Chryst, Serial No. 451,446, filed September 2, 1908. This machine is of the drawer operated class and is provided with a plurality of vertical banks of keys each of which banks is located in a plane with segment gears which serve to actuate the totalizer and transmit their differential movement to indicators. The keys are depressible into the paths of lugs carried by the segment gears and by this means regulate the movement of the segment gears, which are spring actuated. Means are provided which normally prevent the actuation of these segments upon the depression of value keys until the cash drawer is permitted to move to its open position. The drawer is released by the depression of one or more value keys in combination with a depressible element which will hereinafter be referred to as an operating bar. Upon the outstroke of the drawer the segment gears are differentially set as controlled by the keys, but the main totalizer is not in mesh with the segments at this time. The totalizer is meshed at the time the segments are at rest in their moved positions, then by the return movement of the cash drawer power is applied to the segments for the purpose of actuating the totalizer and returning the segments to their home positions. The manner of setting the indicators is not part of the present invention and therefore will not be described in this specification. As above stated the cash drawer normally cannot be released without depressing at least one value key and the operating bar, or by depressing a key hereinafter referred to as an auditor's key, and the operating bar. The drawer latch is therefore constructed so that it cannot move to releasing position until two elements are moved out of retaining position. One of these elements is operated by the operating bar and the other element may be operated either by value keys or the auditor's key. A lock is provided for the auditor's key so that operation of the same, except by authorized persons, is prevented.

In the following detailed description, besides the devices above referred to there will be described indicator screens, a bell mechanism, an auditor's counter, and a customer's counter, but aside from their particular adaptation to the present machine there is no broad novelty in these devices.

If an amount registered consists merely of one numeral or one numeral with one or more ciphers, it is immaterial in what order the value key and the operating bar are depressed. If the amount registered consists of more than one numeral, it is necessary to depress the value keys first before depressing the operating bar as the machine is arranged so that the drawer is immediately released upon the depression of both the operating bar and one of the value keys. Because of this arrangement, if an amount containing only one numeral is to be registered, the value key and the operating bar may be depressed simultaneously. The particular arrangement of the value keys and operating bar with the mechanisms controlled thereby and the devices which embody the remaining improvements is as follows:

The totalizer 1 is controlled by series of value keys through certain differential mechanism and is carried in a frame including arms 55 which are pivoted on a shaft 54. Directly under the totalizer elements are toothed segments 13 pivoted loosely on a rod 13ª and having one space lost motion connection with other key controlled segments 12, which are also loosely pivoted on rod 13ª and are provided at their upper extremities with forwardly extending lugs 11. The value keys 10 are arranged in vertical banks and have a motion radial to segments 12, so that the shank of any depressed key will be in the path of the lug 11 of the corresponding segment.

Figures 6, 7:
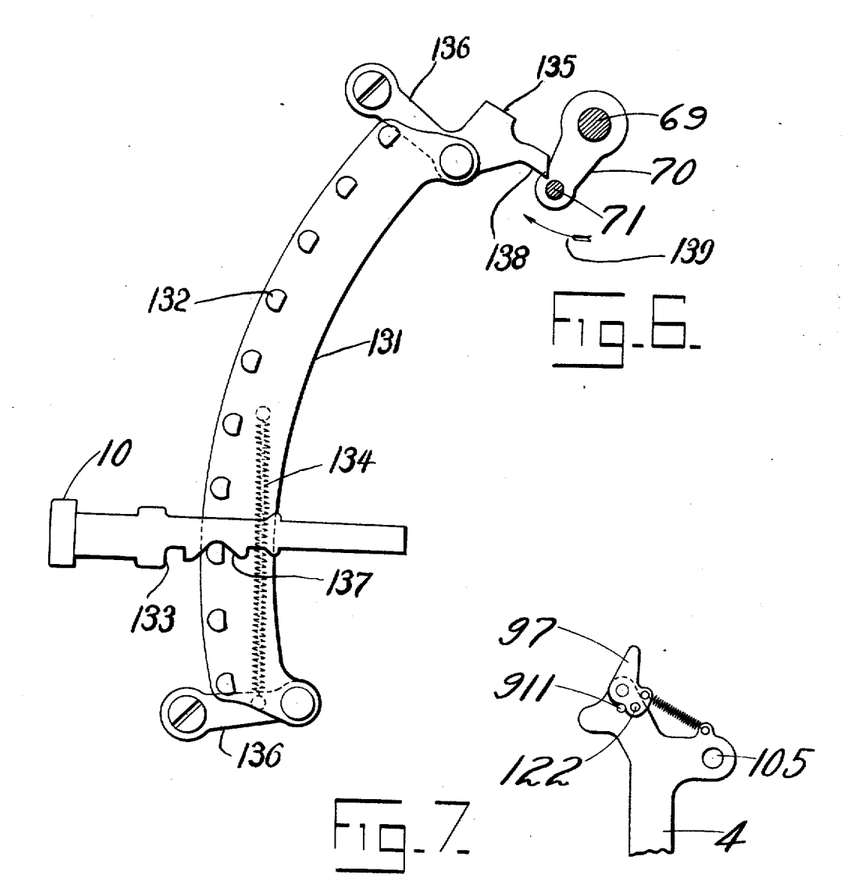
Fig. 6 is a detail in right side elevation of a key locking device whereby depressed keys are locked in their depressed position during the operation of the machine.
Fig. 7 is a detail of a pawl and its carrying arm which are shown in Fig. 2.

The machine is operated by depressing one or more of the value keys 10 and the operating bar 38. By this means the shanks of the desired ones of the keys 10 are brought into the paths of lugs 11 of the segments 12. The value keys 10 are retained in their depressed position by spring actuated plates 131 (Fig. 6) which are provided with pins 132 for entering notches 133 in the keys. When a key is depressed the key first cams the plate 131 downwardly, through engagement with one of the pins 132, until the notch 133 arrives above such pin when the plate springs upwardly under the action of spring 134 latching the key in its depressed position. At the completion of the operation of the machine the keys are released by applying pressure at the point 135 of one of two carrying arms 136 for the plate 131.

The means for depressing plate 131 at the completion of an operation of the machine is not shown in the drawings. It may be seen from Fig. 6 that the upper edge of notch 133 is in a lower horizontal plane than the upper edge of notch 137 which normally coacts with the pin of plate 131. Thus when a key is in its depressed position its respective plate 131 will be held in a lower position than normal, thus bringing the end 138 of arm 136 in the path of a rod 71 which is rocked in the direction indicated by arrow 139 upon the depression of auditor's key 6, as described farther on. By this means it is impossible to depress the auditor's key while an amount key is in its depressed position and also it is impossible to depress an amount key while the auditor's key is in its depressed position, because then the rod 71 is below extension 138 of the arm 136 preventing its movement.

It was stated that the present invention provides a drawer operated machine with very simple and efficient releasing devices and which normally always requires a depression of value keys before the cash drawer may be opened. The invention also provides a totalizer for this class of machine which cannot be reset thus insuring that a total is retained of all additions to the totalizer. This of course means that after a certain amount has been accumulated the pinion of highest order will be continuously rotated without effecting the necessary carrying operations, but as this pinion is of such high order, a complete rotation of it would not likely be lost track of. The totalizer of this invention, as is usual in cash registers, is provided with more denominational elements than there are banks of keys, the carrying devices serving to actuate the elements of higher order.

Figure 3:
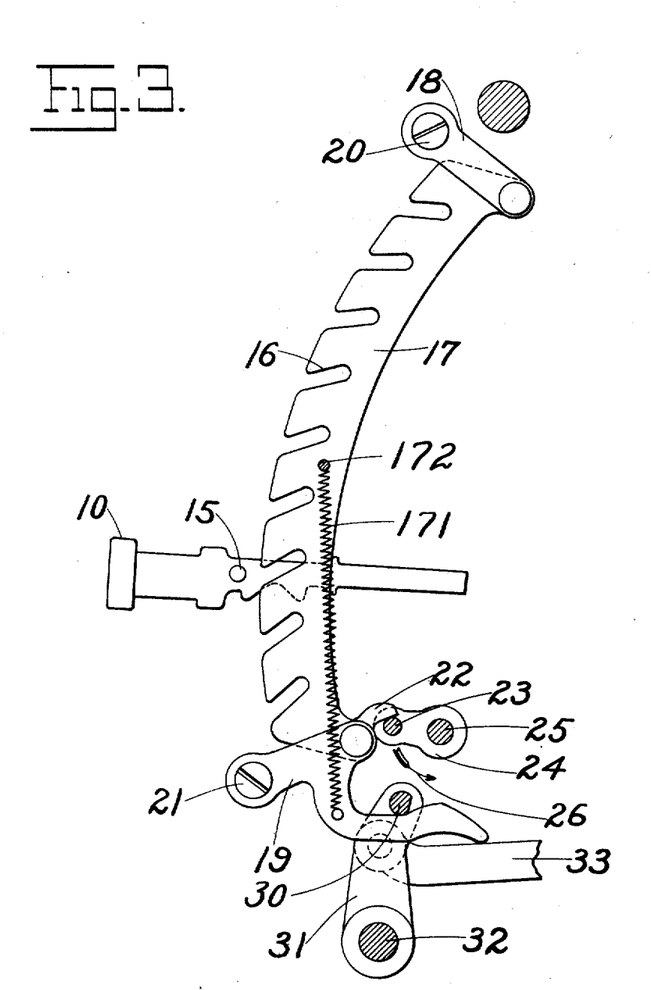
Fig. 3 is a detail in right side elevation of one of the mechanisms which are controlled by banks of amount keys.
Figure 4:
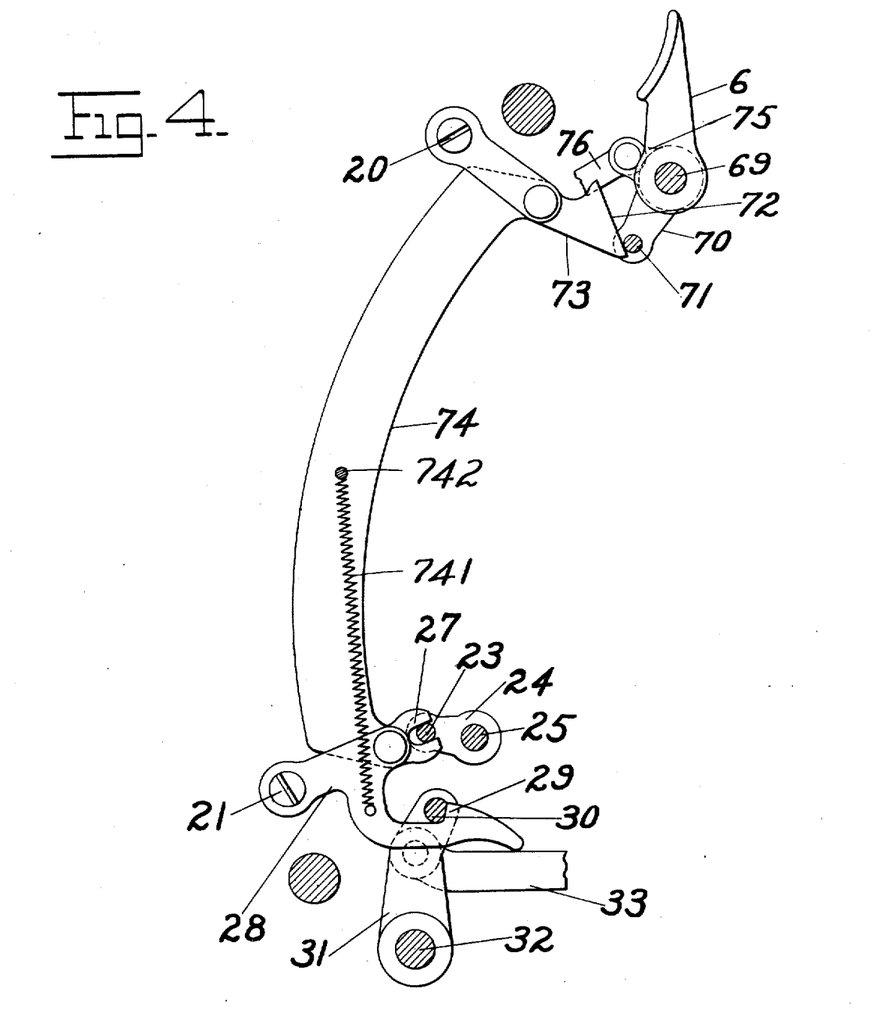
Fig. 4 is a detail in right side elevation of the auditor's key and devices controlled thereby.
Figure 5:
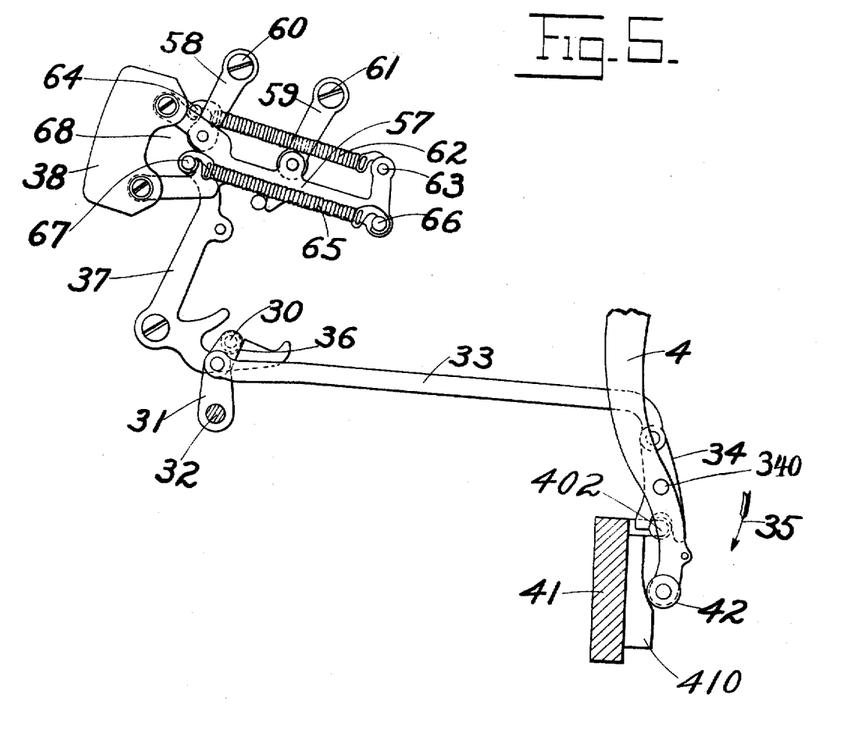
Fig. 5 is a detail in side elevation of the operating bar or drawer release mechanism.

The cash drawer is released as follows: Each value key carries a pin 15 (Fig. 3) which when the key is depressed enters one of inclined slots 16 in a plate 17 forcing the plate downwardly, which downward movement of the plate is employed to free the drawer latch from a certain detent. Each plate 17 is carried by a pair of arms 18 and 19 respectively pivoted to supporting frames by pins 20 and 21. A spring 171 is extended between a frame pin 172 and the arm 19, therefore the plates 17 are normally resiliently held in their upper positions as shown in Fig. 3. The arm 19 has a rearwardly extending lug 22 beneath which is a rod 23 carried by arms 24 fixed to a rod 25 which is journaled in the machine frames. The rod 23 passes through a fork 27 of an arm 28 (Fig. 4). This latter arm is provided with a shoulder 29 extending across the rear flat surface of a bar or rod 30 which is carried by one or more arms 31 fixed to a rod 32 and constitutes part of the holding mechanism for the cash drawer. One of the arms 31 is connected by a link 33 to a drawer latch 34 (Fig. 5) which is pivoted to the machine frame at 340 and normally engages a roll 402 which is carried by a bracket fastened to the rear wall 41 of the cash drawer and through its connection with the cash drawer normally prevents opening of the cash drawer. If, however, the latch 34 is free to rock in the direction indicated by arrow 35 the drawer may move to its open position under spring action, as described farther on, but in order to permit the pawl to rock in this direction arm 28 must be rocked downwardly to carry its shoulder 29 clear of the rod 30. Then arms 31, link 33, and latch 34 may rock rearwardly from the pivots 32 and 340 to allow the opening of the cash drawer, the spring pressure on the drawer serving to rock these elements through the roll 402 as the drawer moves to its open position. The desired downward movement of arm 28 is accomplished by the depression of any one of the value keys, the pin 15 of such key entering one of the inclined slots 16 and therefore forcing plate 17 downwardly and through its carrying arms 19 rocking the rod 23 downwardly and as the rod 23 passes through the fork 27 of arm 28 this arm will be compelled to rock downwardly. The rocking of drawer latch 34 is prevented by one other element, that is, an arm 37 (Fig. 5) which is under the control of an operating bar 38. This bar is constructed as follows. It is mounted upon a member 57 which is carried by a pair of arms 58 and 59 pivoted at their upper ends by pins 60 and 61 to the machine frame. A spring 62 is extended between a pin 63 on the member 57 and a pin 64 extending from the right hand side frame of the machine. A spring 65 is also extended between a pin 66 on the member 57 and a pin 67 on arm 37. By thus mounting the operating bar, spring 62 serves to hold the bar in its undepressed position as shown in Fig. 5, and spring 65 merely serves to unite arm 37 with the member 57. Therefore when operating bar 38 is depressed against the action of spring 62, spring 65 will become tensioned and will draw arm 37 to the right thereby carrying a shoulder 36 of the arm clear of rod 30. The cash drawer is then free to move to its open position and is propelled to this position by springs in the following manner.

A pair of arms 4 (Fig. 2) are pivoted by pins 39 to the side frames of the machine and are normally urged to rock in the direction indicated by arrow 40 by springs 416. At their lower ends the arms are provided with rollers 42 (Fig. 5) which are held in engagement with lugs 410 on the cash drawer by the springs 416. The cash drawer is normally latched in its inner position, as previously described, by the latch 34 and when this arm is released by the downward rocking of arms 28 and 37 the drawer is forced to its open position by springs 416. Upon the opening movement of the drawer the segments 12 of the differential mechanism are permitted to rotate under spring action extents which are determined by the depressed keys, as previously stated.

The meshing and unmeshing of the totalizer 1 with segments 13 is controlled by one of the drawer arms 4. The totalizer rocking mechanism is so constructed that the totalizer is normally in mesh, that is, when the cash drawer is in its home position. It is rocked out of mesh before the beginning of movement of segments 12 and into mesh while the segments are at rest in their moved positions, by one of the drawer arms 4. The shaft 54 to which the totalizer frame 55 is rigidly secured, and which is journaled in the side frames of the machine, carries rigidly secured thereto an arm 53 which is connected by a link 52 to a bell crank lever 49 pivoted to the right hand side frame by a pin 50. This bell crank lever is connected by a link 47 to a similar bell crank lever 45, but reversely mounted, at the rear of the machine. Bell crank lever 45 is pivoted on a pin 46 and is provided with a roll 44 coacting with a pawl 43 on the drawer arm 4. The bell crank lever 49 also carries a roll 550 coacting with the pawl 43.

Upon the beginning of the operation of the machine, when drawer arms 4 rock in the direction indicated by arrow 40 the pawl 43 engages roll 44 rocking bell crank lever 45 so that the link 47 is pushed in the direction indicated by arrow 48. This movement of the link 47 is communicated to link 52 by bell crank lever 49, therefore the totalizer frame 55 is rocked upwardly carrying the totalizer pinions out of mesh. This occurs before movement of segments 12. The segments 12 come to rest in their moved positions before the drawer arms 4 reach their extreme forward position, thus allowing time for the meshing of the totalizer before the drawer arms come to rest. The meshing of the totalizer is accomplished by a reverse movement of the mechanism just pointed out by pawl 43 engaging roller 550 on the bell crank lever 49. By manually pushing the drawer to its inner position drawer arms 4 are restored to their normal position, and these arms are mechanically connected to segments 12 so as to cause a return of the segments and a consequent operation of the totalizer. The return movement of arms 4 also tensions springs 416, so power is stored for the next operation of the machine. During this return movement of drawer arms 4 pawl 43 idly rides over rolls 550 and 44 thus not rocking the totalizer out of mesh.

Figure 1:
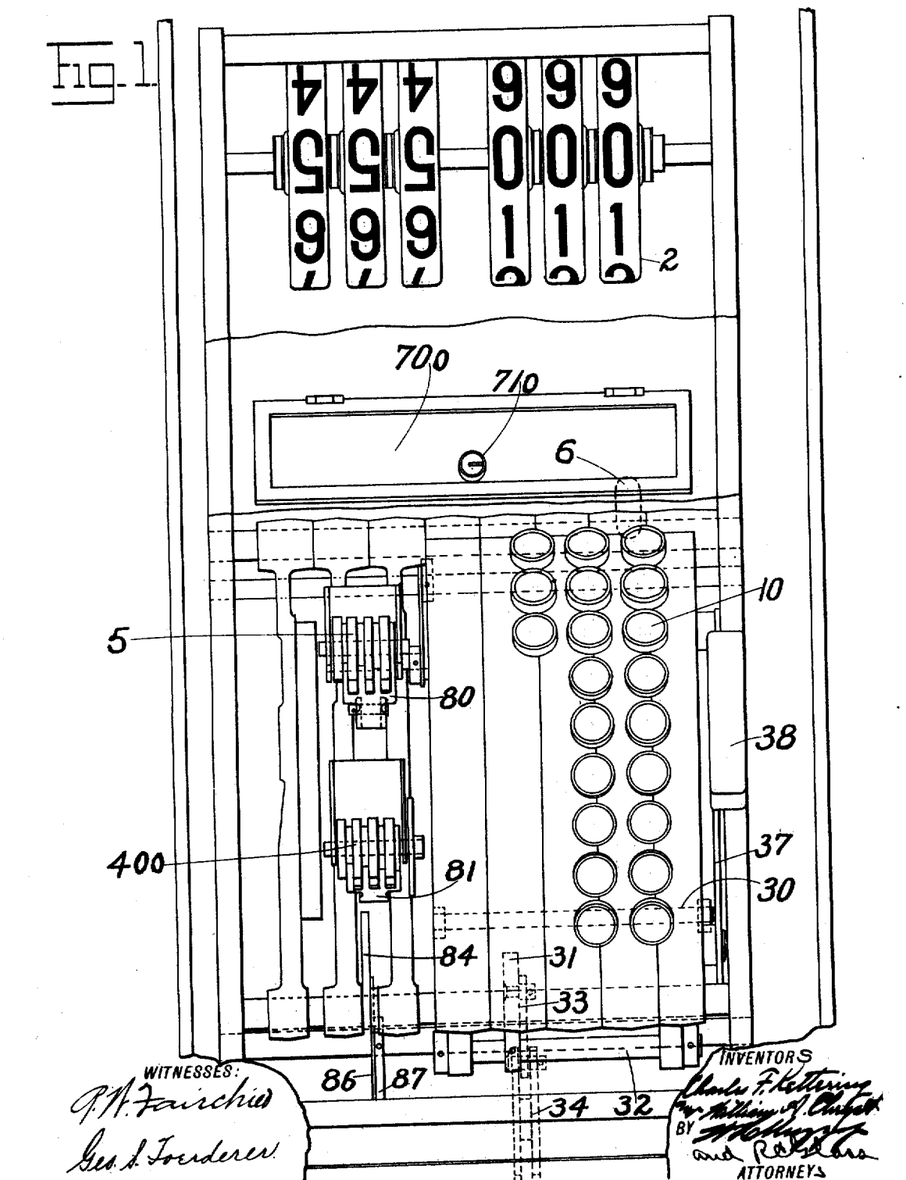
Figure 1 is a front elevation of a cash register constructed according to this invention partly broken away and with the cabinet omitted.

The auditor's key 6 is located within the machine beneath a hinged lid 700 (Fig. 1) which is provided with a key-controlled lock 710 for the purpose of locking the same in its closed position and thus access to the auditor's key is normally prevented. The object of this key is to permit reading of the totalizer and the opening of the cash drawer for auditing purposes without effecting registration. This key is for this purpose provided with means for lowering the arm 28 (Fig. 4) and so permitting the opening of the cash drawer by depressing the auditor's key in combination with operating bar 38, in place of opening the cash drawer by the depression of one or more value keys in combination with the operating bar. Because of this arrangement the cash drawer cannot normally be opened except when a registration is made by actually adding an amount to totalizer 1.

The arrangement of the auditor's key and connecting devices is as follows: The key 6 is fixed to a shaft 69 which carries fixed thereto arms 70 which carry at their lower ends a rod 71 extending across the rear edge 72 of an arm 73 which is pivoted to the machine frame by pin 20. The arm 73 is connected by a link 74 to arm 28. Therefore, when key 6 is depressed arm 23 is rocked downwardly through engagement of the rod 71 with the inclined surface 72 of the arm, the movement being communicated to arm 28 by link 74. Spring 741 which is extended between a frame pin 742 and a pin on the arm 28 offers some resistance to the depression of key 6 and, therefore, upon the release of the key serves to return it to its normal position together with arms 73 and 28 and the link 74.

Figure 2:
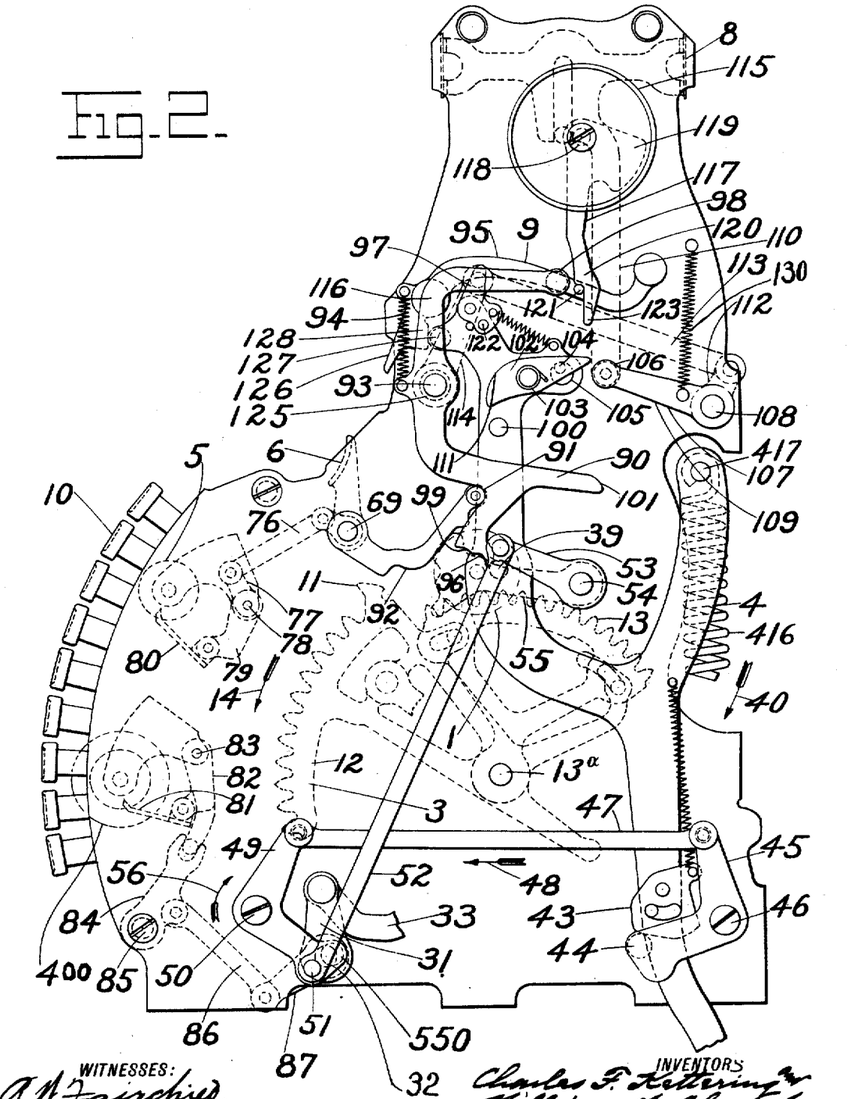
Fig. 2 is a right side elevation with the cabinet and cash drawer omitted.

A device is provided for retaining the auditor's key in its depressed position after it has been depressed until the machine has completed its operation. This consists (Fig. 2) of an arm 92 fixed to shaft 69 and provided with a roll 91, an arm 90, loosely pivoted upon shaft 93, provided with two notches 99 and 96 co-acting with roll 91, and carrying a roll 98 at its upper end, and a pawl 97 carried by one of the drawer arms 4 and co-acting with roll 98. A spring 94 is extended between a pin of the arm 90 and a pin which is carried by a bell hammer 95 and serves to normally retain arm 90 in the position in which it is shown in Fig. 2. When key 6 is depressed arm 92 is rocked downwardly until roll 91 comes to rest in the notch 96 in the arm 90, then upon the forward rocking of the drawer arms 4 pawl 97 idly wipes by roll 98, but upon the return of the drawer arm, pawl 97 strikes roller 98, being prevented from rocking in this direction of movement by a pin 911 on the drawer arm and, therefore, rocks the arm 90 upwardly and releases the auditor's key 6 which then returns to normal position under the action of spring 741. The arm 90 has a rearward extension 101 which, when in its normal position as shown in Fig. 2, or when the auditor's key is fully depressed, is just out of the arc of movement of a pin 100 on the drawer arm. If the auditor's key is only depressed far enough to bring its roll 91 into engagement with the notch 99 the arm 90 will be held up so that its end 101 is in the path of pin 100, therefore, when the drawer arm rocks forwardly the pin 100 will engage the arm 90 rocking it to its normal position and thereby camming arm 92 downwardly so that roll 91 comes to rest in notch 96.

By the above arrangement, if key 6 is not fully depressed it will either be returned to its initial position under spring action, or if it is depressed far enough to bring roll 91 into engagement with the notch 99 of the arm 90 the key will be positively cammed to its fully depressed position.

A bell mechanism (Fig. 2) is provided by which registrations are audibly announced. This comprises a bell 115, hammer 95, spring 94 for actuating the hammer, latch 117 normally holding the hammer against actuation, and pawl 97 of the drawer arm for releasing the latch to permit operation of the bell hammer. Upon the forward rocking of the drawer arms, when pawl 97 strikes roller 98 as previously described, it is rocked against the action of its spring to such position that a pin 122 on the pawl is in line with the lower end 123 of latch 117, this pin striking the end 123 before the pawl 97 clears roll 98 and thus rocking the latch away from pin 121 on the bell hammer, which then springs upwardly to strike the bell, under the action of spring 94. Vibration of the hammer against the bell is prevented by a collar 125 on the shaft 93 which for this purpose co-acts with a downward extension 126 of the bell hammer. The extension 126 engages collar 125 before the bell hammer strikes the bell, the resiliency of the bell hammer permitting the hammer to be carried upwardly far enough to strike the bell but the collar prevents continued vibration of the hammer against the bell. Upon the return of the drawer arms to their normal position a roll 127 carried by one of the arms strikes a shoulder 128 of the bell hammer returning it to its original position where it is retained by latch 117 which is weighted at 119 so that it will rock to normal position when pin 121 of the bell hammer clears the shoulder 120 on the return movement of the bell hammer. Screens 8 for concealing the indicators while the same are being rotated are also actuated by pawls carried by the drawer arms. This pawl 102 is pivoted by a pin to the upper end of one of the drawer arms 4, as indicated in Fig. 2. A spring 103 normally holds the pawl, as shown in this figure, with its pin 104 in engagement with the upper edge of a hole 105 in the drawer arm through which pin 104 extends. The pawl is arranged to engage a roller 106 on an arm 109 secured to a shaft 108. This shaft also carries a pair of arms 107, similar to the arm 109 but located inside of the side frames, carrying at their outer ends uprights 110 which carry indicator springs 8. Springs 130 are extended between pins carried by the arms 107 and pins on the machine frame normally to hold the indicator screens in their upper positions. Shaft 108 carries rigidly an arm 112 which is connected by a link 113 to an arm 114 fixed to shaft 93. This shaft carries indicator alining devices (not shown in the drawings) but which are actuated through this link connection with shaft 108. Upon the forward movement of drawer arms 4 when the pawls 102 are carried rearwardly, rolls 106 are engaged by the inclined surfaces 105 of the pawls and rocked downwardly thereby carrying the screens to concealing position. When the drawer arms reach their extreme forward position pawls 102 pass over the pins 106 thereby permitting the springs 130 to return the screens to their exhibiting position. During the return of the drawer arms pawls 102 engage the rolls 106 at the surface 111 positively forcing the indicator screens to their upper position and actuating the indicator alining devices, if too great resistance is offered to the springs 130.

Counting devices 400 and 5 are provided for counting all operations of the machine and the number of operations of the machine by the depression of auditor's key 6. These counters are of well known construction, the actuating pawl 81 for the counter 400 which is actuated upon all operations of the machine, being pivotally connected to an arm 84 which is pivoted by a pin 85 to the machine frame and oscillated by a link 86 and lever 87 which is secured to shaft 32, the oscillation of which was previously described.

The actuating pawl 80 for the auditor's counter 5 is carried by an arm 79 pivoted at 78 and connected by a link 76 to an arm fixed to shaft 69 which carries the auditor's key 6.

Operation: To enter an amount in the machine, the desired value keys 10 are depressed thereby, through the slotted plate 17 (Fig. 3); rocking rod 23 downwardly around the pivot 25 and thus rocking arm 28 (Fig. 4) downward out of latching relation with rod 30. The keys are retained in depressed position, with their shanks in the paths of lugs 11 of the totalizer actuating segments 12, by pins 132 (Fig. 6) on the spring actuated detents 131. The release bar 38 (Fig. 5) is also depressed thus causing arm 37 to rock rearward and release rod 30 which then rocks rearward around pivot 32, being propelled by springs 416 (Fig. 2) through a connection consisting of arms 4 pivoted on pins 39 and bearing against the rear of the cash drawer, the cash drawer, roller 402 pivoted on the drawer, drawer latch 34 pivoted on fixed pin 340, and the link 33. In this manner, the releasing of rod 30 by depressing both a value key and bar 38 results in outward movement of the cash drawer. The machine is provided with suitable mechanism for permitting differential rocking of the segments 12 when the drawer moves to its open position. This mechanism is described in the before mentioned copending patent application. It permits differential movement of the segments as controlled by the value keys, and it may also be mentioned that devices are provided properly to rotate the indicators 115 according to the extents of movement of segments 12. The indicator screens 8 are moved downward before the indicators are rotated and are released after the indicators are set, by the action of pawl 102, mounted on the drawer arm 4, on roller 106. The totalizer is actuated during the return movement of segments 12 and is left in mesh with these segments at the completion of each operation, and accordingly it is rocked out of mesh with the segments at the beginning of movement of drawer arms 4, before segments 12 are permitted to move. Pawl 43 on one of the drawer arms accomplishes this by engaging roller 44 on bell crank 45, which, through link 47, bell crank 49, link 52, and arm 53 fast on shaft 54, rocks the totalizer frame upward around shaft 54. After segments 12 are at rest in their moved positions, pawl 43 engages roller 550 on bell crank 49, thus restoring the totalizer rocking mechanism to normal position and the totalizer into mesh with the segments. By returning the cash drawer, segments 12 are returned to zero position, thus rotating the totalizer the required amount. The counter 400 counts all operations of the machine by being rotated one unit at each reciprocation of pawl 81 as controlled by the drawer releasing mechanism previously described.

To open the cash drawer without recording an amount in the totalizer, the lid 70 (Fig. 1) must be unlocked and key 6 depressed and the bar 38 be depressed. The depression of key 6, by rocking shaft 69 (Fig. 4), causes rod 71 to pass below shoulders 138 (Fig. 6) of arms 136 and thus prevent the depression of any value keys 10, as the key detents 131 are carried by arms 136. The rod 71 also engages beveled edge 72 of arm 73 thereby, through the connections shown in Fig. 4, lowering arm 28 out of engagement with rod 30. The depression of bar 38 (Fig. 5) also causes the arm 37 to rock out of engagement with rod 30 and the drawer then opens as usual but the totalizer is not rotated as segments 12 are arranged to remain latched in zero position except when value keys in corresponding banks are depressed. The latching means for segments 12 is omitted from the drawings as it is shown and described in the patent application No. 451,446 before mentioned.

While the form of mechanism herein shown and described is admirably adapted to fulfil the objects primarily stated it is to be understood that it is not intended to confine the invention to the one form of embodiment herein shown and described as it is susceptible of embodiment in various forms all coming within the scope of the claims which follow.

What is claimed is:

1. In a machine of the class described, the combination with a cash receptacle and means operated thereby and including a bar, of two pivoted arms having latching projections normally engaging said bar, an operating key connected to withdraw one of said pivoted arms from latching relation, a series of banks of keys, and connections whereby each key in any bank may withdraw the other pivoted arm from latching relation.

2. In a machine of the class described, the combination with a cash receptacle, and holding means therefor, operated thereby and including a pivoted bar, of two pivoted arms having latching projections normally engaging said bar, an operating key connected to withdraw one of said pivoted arms from latching relation, a series of banks of keys, a camming plate operated by the keys of each bank and connections from each of said plates to withdraw said other pivoted arm from latching relation.

3. In a machine of the class described, the combination with a cash receptacle, and holding means therefor, operated thereby and including a pivoted bar, a pivoted arm having a latching projection normally engaging said bar, a series of banks of keys, a camming plate operated by the keys of each bank, and connections whereby any of the plates may withdraw said pivoted arm from latching relation.

4. In a machine of the class described, the combination with a cash receptacle, and holding means therefor, operated thereby and including a pivoted bar, of a pivoted arm having a latching projection normally latching said bar, a series of banks of keys, a plate cammed by the keys of each bank, and a frame including a cross bar operated by any of said plates, and connected to said pivoted arm.

5. In a machine of the class described, the combination with a cash receptacle, and holding means therefor, operated thereby and including a pivoted bar, of a pivoted arm having a latching projection normally latching said bar, a series of banks of keys, a plate cammed by the keys of each bank, a supporting arm for each plate and having an extension in the path of said pivoted bar, and a frame including a cross bar operated by any of said plates and connected to said pivoted arm.

6. In a machine of the class described, the combination with a cash receptacle, and holding means therefor, operated thereby and including a pivoted bar, of a latching arm having a projection normally latching said bar, a series of banks of keys, a plate cammed by the keys of each bank, a frame including a cross bar operated by any of said plates and connected to said latching arm, and additional manipulative means for operating said latching arm.

In testimony whereof we affix our signatures in the presence of witnesses.

CHARLES F. KETTERING.
WILLIAM A. CHRYST.

Witnesses as to the signature of Charles F. Kettering:
R. RUMMLER,
CARL W. BEUST.

Witnesses as to the signature of William A. Chryst:
MORRIS B. WOODSON,
ROBERT R. BOWER.